(12) United States Patent
Zhang

(10) Patent No.: US 10,378,389 B2
(45) Date of Patent: Aug. 13, 2019

(54) GAS TURBINE AND PRESSURIZED WATER REACTOR STEAM TURBINE COMBINED CIRCULATION SYSTEM

(71) Applicant: Lidao Zhang, Shandong (CN)

(72) Inventor: Lidao Zhang, Shandong (CN)

( * ) Notice: Subject to any disclaimer, the term of this patent is extended or adjusted under 35 U.S.C. 154(b) by 0 days.

(21) Appl. No.: 16/231,496

(22) Filed: Dec. 22, 2018

(65) Prior Publication Data

US 2019/0170020 A1 Jun. 6, 2019

Related U.S. Application Data

(63) Continuation of application No. PCT/CN2017/000395, filed on Jun. 22, 2017.

(30) Foreign Application Priority Data

Jun. 23, 2016 (CN) .......................... 2016 1 0458572

(51) Int. Cl.
*F01K 7/22* (2006.01)
*F01K 11/02* (2006.01)
(Continued)

(52) U.S. Cl.
CPC ................ *F01K 11/02* (2013.01); *F01K 7/16* (2013.01); *F02C 6/18* (2013.01); *G21C 1/04* (2013.01); *G21D 1/006* (2013.01)

(58) Field of Classification Search
CPC .......... F01K 17/025; F01K 7/16; F01K 19/10; F05D 2260/20; F05D 2220/32;
(Continued)

(56) References Cited

U.S. PATENT DOCUMENTS 5,357,746 A * 10/1994 Myers .................. F01K 23/106
60/39.182
6,041,588 A * 3/2000 Bruckner ................ F02C 7/224
60/772
(Continued)

FOREIGN PATENT DOCUMENTS

CA 2481522 A1 4/2006
CN 1300901 A 6/2001
(Continued)

*Primary Examiner* — Mark A Laurenzi
*Assistant Examiner* — Shafiq Mian
(74) *Attorney, Agent, or Firm* — Wayne & Ken, LLC; Tony Hom

(57) ABSTRACT

Disclosed is a gas turbine and pressurized water reactor steam turbine combined circulation system, using a heavy duty gas turbine and a pressurized water reactor steam turbine to form a combined circulation system. Heat of the tail gas of the gas turbine is utilized to raise the temperature of a secondary circuit main steam from 272.8° C., and the temperature of the secondary circuit main steam slides between 272.8° C. and 630° C. according to different pressurized water reactor steam yields and different input numbers and loads of the heavy duty gas turbine. The system has a higher heat efficiency than that of the pressurized water reactor steam turbines in the prior art; and as for the electric quantity additionally generated by gas, the heat efficiency of the system is also significantly higher than that of gas-steam combined circulation in the prior art.

1 Claim, 1 Drawing Sheet

(51) Int. Cl.
- *F02C 6/18* (2006.01)
- *G21C 1/04* (2006.01)
- *G21D 1/00* (2006.01)
- *F01K 7/16* (2006.01)

(58) Field of Classification Search
CPC .. F05D 2220/60; F05D 2220/72; F02C 7/224; F02C 6/18
See application file for complete search history.

(56) References Cited

U.S. PATENT DOCUMENTS

| | | | | |
|---|---|---|---|---|
| 6,101,982 | A * | 8/2000 | Fischer | F02C 7/224 122/1 R |
| 6,145,295 | A * | 11/2000 | Donovan | F01K 23/106 60/39.182 |
| 6,389,797 | B1 * | 5/2002 | Sugishita | F01K 23/106 60/39.182 |
| 7,770,376 | B1 * | 8/2010 | Brostmeyer | F01K 23/10 60/39.17 |
| 7,874,162 | B2 * | 1/2011 | Tomlinson | F01K 23/106 122/7 B |
| 8,141,367 | B2 * | 3/2012 | Rancruel | F02C 6/18 60/39.182 |
| 8,572,975 | B2 * | 11/2013 | Bilton | F02C 7/224 60/736 |
| 9,019,108 | B2 * | 4/2015 | Chillar | F01K 13/003 340/500 |
| 9,470,145 | B2 * | 10/2016 | Ball, Jr. | F02C 7/224 |
| 9,903,276 | B2 * | 2/2018 | Hotta | F01K 23/10 |
| 2003/0043952 | A1 * | 3/2003 | Itou | F01K 7/223 376/211 |
| 2004/0148941 | A1 * | 8/2004 | Wylie | F01K 23/103 60/772 |
| 2007/0204623 | A1 * | 9/2007 | Rollins, III | F01K 23/105 60/772 |
| 2015/0033742 | A1 * | 2/2015 | Herrazti Garcia | F01K 3/181 60/653 |
| 2018/0238271 | A1 * | 8/2018 | Bahn | F02K 9/42 |

FOREIGN PATENT DOCUMENTS

| | | |
|---|---|---|
| CN | 1656570 A | 8/2005 |
| CN | 104314628 A | 1/2015 |
| CN | 104599730 A | 5/2015 |
| CN | 105439233 A | 3/2016 |
| CN | 106050419 A | 10/2016 |
| DE | 102008003138 A1 | 7/2008 |
| RU | 2547828 C1 | 4/2015 |

* cited by examiner

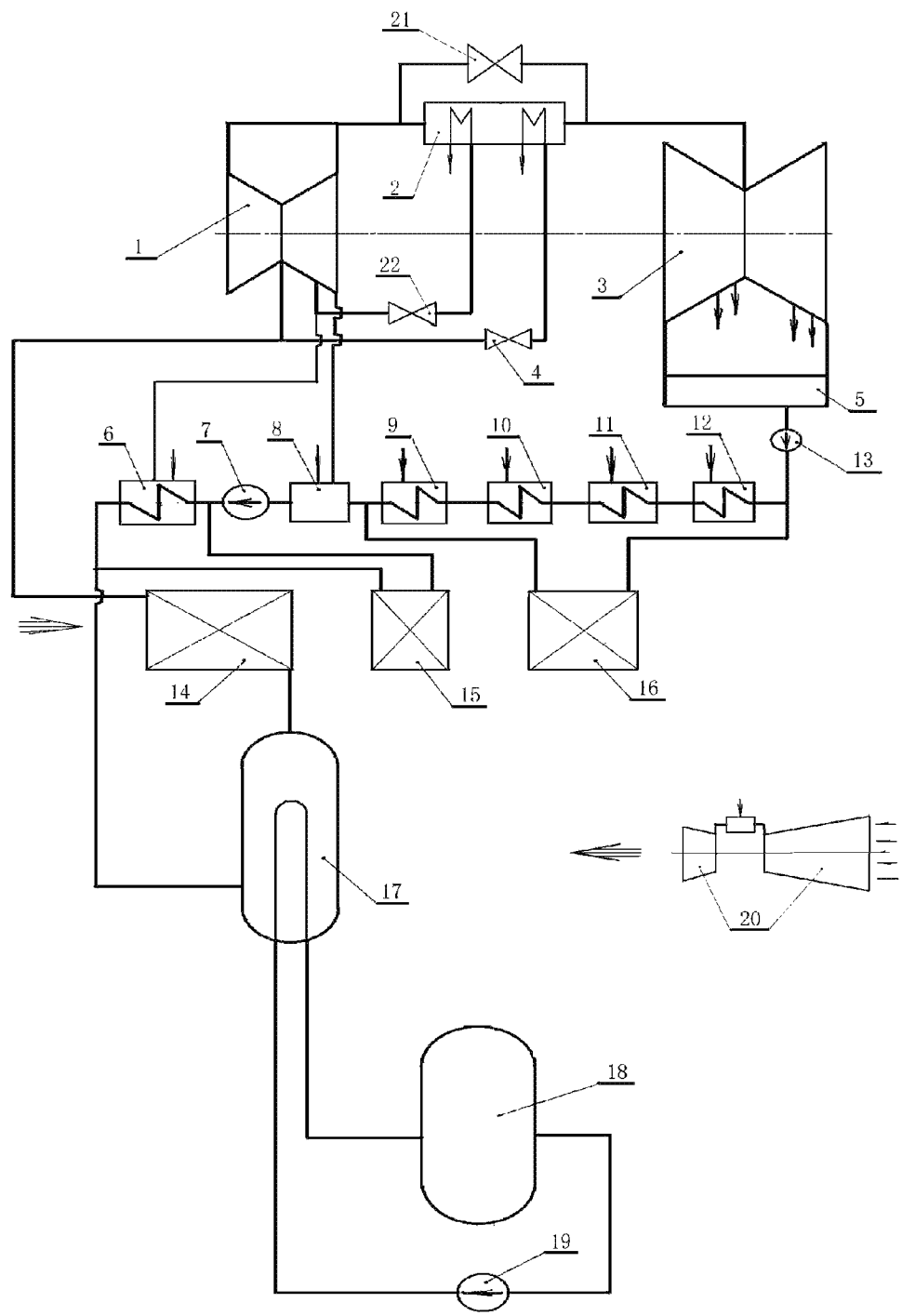

GAS TURBINE AND PRESSURIZED WATER REACTOR STEAM TURBINE COMBINED CIRCULATION SYSTEM

CROSS-REFERENCE TO RELATED APPLICATIONS

This application is a continuation of International Application No. PCT/CN2017/000395, filed on Jun. 22, 2017, which claims priority from Chinese Patent Application No. 201610458572.3, filed on Jun. 23, 2016, both of which are hereby incorporated by reference in their entireties.

TECHNICAL FIELD

The gas turbine and pressurized water reactor steam turbine combined circulation system of the present disclosure relates to a large-capacity, energy-saving, low-carbon, clean energy system. Thermal efficiency of the gas turbine and pressurized water reactor steam turbine combined circulation system is significantly higher than that of pressurized water reactor steam turbine in prior art; thermal efficiency of the gas turbine and pressurized water reactor steam turbine combined circulation system is also significantly higher than that of the gas-steam combined cycle in prior art.

BACKGROUND OF THE PRESENT INVENTION

The pressurized water reactor uses pressurized light water as a coolant and moderator, and the water does not boil in the reactor. Nuclear fuel is low enriched uranium. It is recognized by the world as a nuclear reactor with mature large-scale technology and safe operation and economy. The AP1000 can be used as a representative product of the third generation of pressurized water reactor nuclear power plants.

The main parameters of the AP1000 third-generation nuclear power plant steam generator (Steam Generator):

| | |
|---|---|
| Heat exchange area | 11500 m² |
| Primary side designed pressure | 172 bar · a |
| Secondary side designed pressure | 82.5 bar · a |
| Heat exchange power | 1707.5 MW |
| Export steam pressure | 57.5 bar · a |
| Steam flow rate | 943.7 kg/s |
| Feed water temperature | 226.7° C. |
| Primary side inlet temperature | 321.1° C. |
| Primary side outlet temperature | 280.7° C. |
| Outlet steam temperature | 272.8° C. |
| Secondary side designed temperature | 315.6° C. |

The main parameters of the AP1000 third-generation nuclear power plant steam turbine generator:

| | |
|---|---|
| Turbine type | single shaft, four cylinder six exhaust steam |
| Last-stage blade length | 1371.6 mm (a longer last-stage blade is used after introduction in China) |
| Rotational speed | 1800 rpm (modified to 1500 rpm after introduction in China) |
| Back pressure | 8.48 kPa |
| Output power | 1,199,500 kW (thermal balance value) |
| Turbine heat rate | 10405.7 kJ/kWh (excluding electric pump power) |
| Thermal efficiency | 34.6% (excluding electric pump power) |
| Generator cooling method | water hydrogen hydrogen |
| Hydrogen pressure | 0.517 MPa |
| Rated output apparent power | 1375 MVA |
| Power factor | 0.9 |

The saturated steam generated by the two steam generators is sent to the steam turbine high-pressure cylinder by the second circuit main steam system, and after the expansion work of the steam turbine high-pressure cylinder, the steam is discharged into two external steam-water separation reheaters; under the rated load, the external steam-water separation reheater reduces the humidity of 10%-13% contained in the steam exhaust of the steam turbine to about 0.17% or less. The external steam-water separation reheater has a two-stage reheater, and the first stage uses steam admission of the high-pressure cylinder as a heat source, and the second stage uses the main steam as a heat source, to heat the steam entering the reheater to a superheated state. The steam is heated and then enters three dual-flow turbine low-pressure cylinders through six pipes; part of the steam from the high-pressure cylinder and the low-pressure cylinder is extracted out to heat the feed water and condensate. The main condenser deoxidizes the condensate and transfers the waste heat to the circulating water system; the feed water is injected into the steam generator by the second circuit main feed pump; the steam turbine provides the steam extraction for the six-stage feed water and condensate heating; the extraction point of the high-pressure cylinder provides steam extraction for the number one high-pressure heater, and the high-pressure cylinder steam exhaust provides steam extraction to the deaerator. The third, fourth, fifth, and sixth-stage extraction points of the low-pressure cylinder supply steam extraction for the number three, number four, number five and number sixth low-pressure heaters, respectively, and the number five low-pressure heater and the number six low-pressure heater are usually arranged in the throat of the condenser.

Nuclear power plants that have been put into commercial operation in China (including Taiwan) are almost all pressurized water reactors; from the perspectives of technology, safety, economy, environmental protection and industrial characteristics, pressurized water reactor nuclear power units should not participate in power grid peaking, especially in frequent and drastic load adjustment.

According to the working temperature and the power of the unit, the heavy-duty gas turbines for power stations are divided into eight classes: A-B-C-D-E-F-G-H. The higher the intake temperature of the gas turbine, the higher the unit power, the higher the class, the higher the thermal efficiency, and the higher the steam exhaust temperature of the gas turbine.

The prior art gas turbine generally forms a gas-steam combined circulation system with a waste heat boiler and a steam turbine of the prior art; the steam turbine is or not reheated, has no steam extraction port, and has a medium and low-pressure supplemental steam inlet; the steam turbine is equipped with necessary auxiliary machines, such as condensate pump, circulating water pump, condenser, vacuum pump, cooling tower, lubricating oil system, control oil system, bypass system, etc.; the waste heat boiler is usually designed to operate under double pressures or triple pressures, respectively providing superheated steam of different pressures, each pressure having its own economizer, evaporator, steam drum and superheater; usually power generation of the gas turbine-driven generators accounts for ⅔ or more of the gas-steam combined cycle unit; power generation of the steam turbine-driven generators accounts for about ⅓ or less of the gas-steam combined cycle unit.

SUMMARY OF THE PRESENT INVENTION

Technical Problems to be Solved

The steam generator of the pressurized water reactor can only produce the saturated steam used in the second circuit, and has no steam superheating ability; the main function of the external steam-water separation reheater is to reduce the humidity of 10%-13% contained in the steam exhaust of the high-pressure steam turbine to about 0.17% or less, and in order to obtain a superheat less than 90K at the low-pressure cylinder inlet, even the second circuit main steam is used as the heat source of the external steam-water separation reheater; the high-pressure cylinder of the pressurized water reactor steam turbine is basically a wet steam turbine, the turbine blades of each turbine stage operate under wet steam conditions, which is not favorable for the long-term safe operation of the rotor blades; the low-pressure cylinder exhaust steam humidity is also quite higher than the coal-fired super-supercritical unit; the internal efficiency of the high-pressure cylinder and low-pressure cylinder is only about 80%, and its heat consumption is as high as 10405.7 kJ/kWh (excluding the electric pump power), and thermal efficiency is only 34.6% (excluding the electric pump power).

The Technical Solution Adopted to Solve its Technical Problems

The gas turbine and pressurized water reactor steam turbine combined circulation system of the invention adopts a completely different technical route from the prior art, and a combined circulation system is composed of a heavy-duty gas turbine and a pressurized water reactor steam turbine, and the heat of the gas turbine steam exhaust is used to set the main steam temperature of the second circuit from 272.8° C. Upward lifting, with the difference in steam produced by the pressurized water reactor and the number of heavy-duty gas turbine inputs and the load, the main steam temperature of the second circuit is operated in the range of 272.8° C. to 630° C.; the gas turbine and pressurized water reactor steam turbine combined circulation system Thermal efficiency is significantly higher than that of the prior art pressurized water reactor steam turbine; thermal efficiency of the gas turbine and pressurized water reactor steam turbine combined circulation system is also significantly higher than that of the prior art gas-steam combined cycle.

The present disclosure discloses a gas turbine and pressurized water reactor steam turbine combined circulation system, comprising: a steam turbine high-pressure cylinder (1), a steam-water separation reheater (2), a steam turbine low-pressure cylinder (3), a main steam reheat shutoff valve (4), a condenser (5), a number one high-pressure heater (6), a second circuit main feed water pump (7), a deaerator (8), a number three low-pressure heater (9), a number four low-pressure heater (10), a number five low-pressure heater (11), a number six low-pressure heater (12), a condensate pump (13), a waste heat boiler superheater (14), a waste heat boiler high-pressure economizer (15), a waste heat boiler low-pressure economizer (16), a steam generator (17), a pressurized water reactor (18), a first circuit main feed water pump (19), a gas turbine (20), a steam-water separation reheater bypass valve (21), a first-stage steam extraction reheat shutoff valve (22), a DCS distributed control system; heat generated by nuclear fuel rod in the pressurized water reactor (18) generates second circuit saturated steam in steam generator (17) through circulating first circuit pressurized water; a saturated steam outlet of the steam generator (17) is connected to a steam inlet of the waste heat boiler superheater (14); a steam outlet of the waste heat boiler superheater (14) is connected to a steam inlet of the steam turbine high-pressure cylinder (1) through a main steam valve and a speed control valve; the steam outlet of the waste heat boiler superheater (14) is connected to a main steam inlet of the steam-water separation reheater (2) through the main steam reheat shutoff valve (4); the first-stage steam extraction outlet of the steam turbine high-pressure cylinder is connected to a first-stage steam extraction inlet of the steam-water separation reheater (2) through the first-stage steam extraction reheat shutoff valve (22); a water side of the waste heat boiler high-pressure economizer (15) is connected in parallel with a water side of the number one high-pressure heater (6), to heat a high-pressure feed water at an outlet of the second circuit main feed water pump (7) in a split manner; a water side of the waste heat boiler low-pressure economizer (16) is connected in parallel with a water side of a low-pressure heater group constituted by the number three low-pressure heater (9), the number four low-pressure heater (10), the number five low-pressure heater (11) and the number six low-pressure heater (12) which are connected in series, to heat condensate at an outlet of the condensate pump (13) is heated in a shunt manner; a turbocompressor inlet of the gas turbine (20) draws in air through an air filter group, and compressed air is mixed with natural gas and fully burned in the low nitrogen combustion system of the gas turbine (20), and high-temperature and high-pressure gas applies work in a gas turbine group of the gas turbine (20) to drive a turbogenerator at a side of the gas turbine; steam exhaust at the gas turbine group of gas turbine (20) enters a smoke-side inlet of a gas turbine waste heat boiler comprising the waste heat boiler superheater (14), the waste heat boiler high-pressure economizer (15), and the waste heat boiler low-pressure economizer (16) through a smoke duct; a smoke-side outlet of the gas turbine waste heat boiler is connected to a chimney or smoke is exhausted by a cooling tower in a manner of integrated chimney and cooling tower; a heavy-duty gas turbine and a pressurized water reactor steam turbine form a combined circulation system, and the heat of steam exhaust of the gas turbine is used to raise a main steam temperature of the second circuit from 272.8° C., where depending on different steam output of the pressurized water reactor as well as number and load of the heavy-duty gas turbine, the main steam temperature of the second circuit is operated in the range of 272.8° C. to 630° C.; the DCS distributed control system coordinates the control of the pressurized water reactor (18), the gas turbine (20), the steam-water separation reheater (2), the main steam reheat shutoff valve (4), the first-stage steam extraction reheat shutoff valve (22), the steam-water separation reheater bypass valve (21), the steam turbine high-pressure cylinder (1), and steam turbine low-pressure cylinder (3), where depending on different steam output of the pressurized water reactor as well as number and load of the heavy-duty gas turbine, the main steam temperature of the second circuit is operated in the range of 272.8° C. to 630° C.; the steam turbine high-pressure cylinder (1) is of dual flow and tangential steam admission with a rotor speed of 1500 rpm or 1800 rpm, where its flow capacity is designed based on simultaneous realization of both highest steam admission temperature and highest mass flow rate; materials used for a rotor, a high-temperature steam admission chamber, nozzles and blades of the steam turbine high-pressure cylinder (1) meet requirements for continuous operation at the highest steam admission temperature; strengths of the rotor, the high-temperature steam admission chamber, the nozzles and the blades of the steam turbine high-pressure cylinder (1) meet requirements of the simultaneous realization of both the highest steam admission temperature and the highest mass flow rate and have sufficient safety allowance; the steam turbine low-pressure cylinder (3) is constituted by three or four coaxial low-pressure cylinders of dual-flow and tangential steam admission depending on different operation backpressure; a steam admission temperature of the steam turbine low-pressure cylinder (3) is operated in the range of 343.5° C. to 253.6° C.; a maximum flow capacity of the steam turbine low-pressure cylinder (3) is designed based on a steam admission temperature of 343.5° C.; when a load of the gas turbine (20) is reduced, a steam admission temperature of the steam turbine low-pressure cylinder (3) is reduced to near 253.6° C., the main steam reheat shutoff valve (4) is switched on, and the steam-water separation reheater bypass valve (21) is switched off, so that the steam admission temperature of the steam turbine low-pressure cylinder (3) is not lower than 253.6° C.; when a load of the gas turbine (20) becomes 0, the first-stage steam extraction reheat shutoff valve (22) is switched on; the gas turbine (20) is constituted by three H-class gas turbines; the three H-class gas turbines respectively drive respective turbogenerators; gas turbine steam exhaust from the outlets of the gas turbine groups of the three H-class gas turbines is discharged into a same waste heat boiler; the steam-water separation reheater (2) is constituted by six or eight steam-water separation reheaters, that is, each steam admission and guide pipe of the low-pressure cylinder is equipped with a steam-water separation reheater; each steam-water separation reheater is equipped with a corresponding main steam reheat shutoff valve, a first-stage steam extraction reheat shutoff valve and a steam-water separation reheater bypass valve; when the steam-water separation reheater bypass valve is switched on, a pressure difference between an inlet and an outlet of the steam-water separation reheater does not exceed 15 kPa; the gas turbine waste heat boiler comprises a waste heat boiler superheater (14), a waste heat boiler high-pressure economizer (15), and a waste heat boiler low-pressure economizer (16); horizontal arrangement; the waste heat boiler superheater (14) is constituted by three stages superheater heating surfaces of high-temperature stage, medium-temperature stage, and low-temperature stage, and is arranged in a counter-flow manner with respect to the smoke duct; the waste heat boiler high-pressure economizer system is equipped with corresponding regulating valve groups for regulating flow distributions at a water side of the waste heat boiler high-pressure economizer (15) and at a water side of the number one high-pressure heater (6); the low-pressure economizer system configuration of the waste heat boiler is equipped with corresponding regulating valve groups for regulating flow distributions at a water side of the waste heat boiler low-pressure economizer (16) and at a water side of a low-pressure heater group constituted by the number three low-pressure heater (9), the number four low-pressure heater (10), the number five low-pressure heater (11), and the number six low-pressure heater (12) connected in series.

Advantageous Effects of the Invention

The pressurized water reactor steam turbine is a steam turbine whose steam temperature slides between 272.8° C. and 630° C. and which is originated from a wet steam turbine. In the high main steam temperature condition, the inlet enthalpy value of the main steam of the pressurized water reactor steam turbine is greatly improved, the internal efficiency of each turbine stage is also significantly improved, under the same inlet mass flow conditions, the effective enthalpy value reduction of the pressurized water reactor steam turbine is greatly improved, and the output shaft power is greatly increased;

In the high main steam temperature condition, the turbine stage of the steam turbine high-pressure cylinder eliminates the risk of water erosion, and the safety and economy is obviously improved;

In the high main steam temperature condition, the steam turbine low-pressure cylinder of most turbine stages eliminates the risk of water erosion, and the safety is obviously improved; the humidity of the last stage blade and the penultimate stage blade is significantly reduced, and the safety and economy are obviously improved;

Since the humidity of the last stage blade and the penultimate stage blade is significantly reduced, the safety is controllable, which provides a space for further reducing the exhaust backpressure of the low-pressure cylinder, and thereby improving thermal efficiency of the combined circulation system of the gas turbine and pressurized water reactor steam turbine;

The settings of the waste heat boiler high-pressure economizer (15) and the waste heat boiler low-pressure economizer (16) enable the smoke waste heat at the outlet of the waste heat boiler superheater (14) to be fully utilized, and the smoke exhaust temperature can be lowered to 45° C. or lower; push out the part of one-stage steam extraction, three-stage steam extraction, four-stage steam extraction, five-stage steam extraction, and six-stage steam extraction can continue to work in the steam turbine low-pressure cylinder (3) and be converted to useful shaft power;

According to the gas turbine and pressurized water reactor steam turbine combined circulation system of the present disclosure, a half-speed (1800 rpm or 1500 rpm) giant steam turbine with a single-axis output of 2000 MW or higher can be designed and manufactured;

According to the gas turbine and pressurized water reactor steam turbine combined circulation system of the present disclosure, a half-speed (1800 rpm or 1500 rpm) giant generator with a single-axis output of 2200 MVA or higher can be designed and manufactured;

According to the gas turbine and pressurized water reactor steam turbine combined circulation system of the present disclosure, large and medium-sized air-cooled generator groups can be designed and manufactured, which is suitable for inland water-deficient areas;

The low-power gas turbine and pressurized water reactor steam turbine combined circulation system is suitable for all-electric propulsion of large naval vessels and civil ships;

The construction cost of the gas turbine and pressurized water reactor steam turbine combined circulation system of the present disclosure is significantly lower than that of a combination of the independent pressurized water reactor nuclear power unit and the independent gas-steam combined cycle unit having the same capacity;

The occupied area of the gas turbine and pressurized water reactor steam turbine combined circulation system of the present disclosure is significantly lower than that of a combination of the independent pressurized water reactor nuclear power unit and the independent gas-steam combined cycle unit having the same capacity;

The carbon emission of the gas turbine and pressurized water reactor steam turbine combined circulation system of the present disclosure is significantly lower than that of a combination of the independent pressurized water reactor nuclear power unit and the independent gas-steam combined cycle unit having the same capacity;

The water consumption per unit installed capacity of the gas turbine and pressurized water reactor steam turbine combined circulation system of the present disclosure is significantly lower than that of a combination of the independent pressurized water reactor nuclear power unit and the independent gas-steam combined cycle unit having the same capacity;

The power supply of the gas turbine and pressurized water reactor steam turbine combined circulation system is significantly larger than that of an independent pressurized water reactor nuclear power unit with the same nuclear fuel consumption and the independent gas-steam combined cycle unit with the same natural gas consumption;

Retain the steam-water separation reheater (2), when the system load is low, mediate all the gas turbine (20), open the main steam reheat shutoff valve (4) and the first stage steam extraction reheat shutoff valve (22), close the steam-water separation reheater bypass valve (21), the pressurized water reactor steam turbine is operated at base load, and the gas turbine (20) still has a full and complete daily peaking capability;

If the increased power generation of the pressured water reactor steam turbine due to the significant increase in the inlet enthalpy of the main steam and the internal efficiency of each turbine stage is totally ascribed to the gas-steam combined cycle, the net heat efficiency of the gas-steam combined cycle which does not have the independent steam turbine can be 65% or higher;

Each gas turbine (20) has its own turbogenerator. The large number of gas turbines is the most reliable multi-security power supply, which is enough to ensure continuous operation of the main circuit feed pump (19) and the secondary circuit main feed pump (7) in disaster situations, which effectively prevents a malignant accident of reactor core melting.

BRIEF DESCRIPTION OF THE DRAWINGS

FIG. 1 is the system diagram of a gas turbine and pressurized water reactor steam turbine combined circulation system In FIG. 1:
1 steam turbine high-pressure cylinder,
2 steam-water separation reheater,
3 steam turbine low-pressure cylinder,
4 main steam reheat shutoff valve,
5 condenser,
6 number one high-pressure heater,
7 second circuit main feed pump,
8 deaerator,
9 number three low-pressure heater,
10 number four low-pressure heater,
11 number five low-pressure heater,
12 number six low-pressure heater,
13 condensate pump,
14 waste heat boiler superheater,
15 waste heat boiler high-pressure economizer,
16 waste heat boiler low-pressure economizer,
17 steam generator,
18 pressurized water reactor,
19 first circuit main feed pump,
20 gas turbine,
21 steam-water separation reheater bypass valve,
22 first-stage steam extraction reheat shutoff valve.

DETAILED DESCRIPTION OF THE PRESENT INVENTION

Example 1

A preferred embodiment of the present disclosure will now be described with reference to FIG. 1 with an AP1000 PWR, steam generator, redesigned steam turbine generator group and three H-class gas turbines and associated waste heat boilers as an example.

The present disclosure discloses a gas turbine and pressurized water reactor steam turbine combined circulation system, comprising: a steam turbine high-pressure cylinder (1), a steam-water separation reheater (2), a steam turbine low-pressure cylinder (3), a main steam reheat shutoff valve (4), condenser (5), a number one high-pressure heater (6), a second circuit main feed water pump (7), a deaerator (8), a number three low-pressure heater (9), a number four low-pressure heater (10), a number five low-pressure heater (11), a number six low-pressure heater (12), a condensate pump (13), a waste heat boiler superheater (14), a waste heat boiler high-pressure economizer (15), a waste heat boiler low-pressure economizer (16), a steam generator (17), a pressurized water reactor (18), a first circuit main feed water pump (19), a gas turbine (20), a steam-water separation reheater bypass valve (21), a first-stage steam extraction reheat shutoff valve (22), a DCS distributed control system; heat generated by nuclear fuel rod in the pressurized water reactor (18) generates second circuit saturated steam in steam generator (17) through circulating first circuit pressure water; a saturated steam outlet of the steam generator (17) is connected to a steam inlet of the waste heat boiler superheater (14); a steam outlet of the waste heat boiler superheater (14) is connected to a steam inlet of the steam turbine high-pressure cylinder (1) through a main steam valve and a speed control valve; the steam outlet of the waste heat boiler superheater (14) is connected to a main steam inlet of the steam-water separation reheater (2) through the main steam reheat shutoff valve (4); the first-stage steam extraction outlet of the steam turbine high-pressure cylinder is connected to a first-stage steam extraction inlet of the steam-water separation reheater (2) through the first-stage steam extraction reheat shutoff valve (22); a water side of the waste heat boiler high-pressure economizer (15) is connected in parallel with a water side of the number one high-pressure heater (6), to heat a high-pressure feed water at an outlet of the second circuit main feed water pump (7) in a split manner; a water side of the waste heat boiler low-pressure economizer (16) is connected in parallel with a water side of a low-pressure heater group constituted by the number three low-pressure heater (9), the number four low-pressure heater (10), the number five low-pressure heater (11) and the number six low-pressure heater (12) which are connected in series, to heat condensate at an outlet of the condensate pump (13) is heated in a shunt manner; a turbocompressor inlet of the gas turbine (20) draws in air through an air filter group, and compressed air is mixed with natural gas and fully burned in the low nitrogen combustion system of the gas turbine (20), and high-temperature and high-pressure gas applies work in a gas turbine group of the gas turbine (20) to drive a turbogenerator at a side of the gas turbine; steam exhaust at the gas turbine group of gas turbine (20) enters a smoke-side inlet of a gas turbine waste heat boiler comprising the waste heat boiler superheater (14), the waste heat boiler high-pressure economizer (15), and the waste heat boiler low-pressure economizer (16) through a smoke duct; a smoke-side outlet of the gas turbine waste heat boiler is connected to a chimney or smoke is exhausted by a cooling tower in a manner of integrated chimney and cooling tower; a heavy-duty gas turbine and a pressurized water reactor steam turbine form a combined circulation system, and the heat of steam exhaust of the gas turbine is used to raise a main steam temperature of the second circuit from 272.8° C., where depending on different steam output of the pressurized water reactor as well as number and load of the heavy-duty gas turbine, the main steam temperature of the second circuit is operated in the range of 272.8° C. to 630° C.; the DCS distributed control system coordinates the control of the pressurized water reactor (18), the gas turbine (20), the steam-water separation reheater (2), the main steam reheat shutoff valve (4), the first-stage steam extraction reheat shutoff valve (22), the steam-water separation reheater bypass valve (21), the steam turbine high-pressure cylinder (1), and steam turbine low-pressure cylinder (3), where depending on different steam output of the pressurized water reactor as well as number and load of the heavy-duty gas turbine, the main steam temperature of the second circuit is operated in the range of 272.8° C. to 630° C.

The steam turbine high-pressure cylinder (1) is of dual flow and tangential steam admission with a rotor speed of 1500 rpm or 1800 rpm, where its flow capacity is designed based on simultaneous realization of both highest steam admission temperature and highest mass flow rate; materials used for a rotor, a high-temperature steam admission chamber, nozzles and blades of the steam turbine high-pressure cylinder (1) meet requirements for continuous operation at the highest steam admission temperature; strengths of the rotor, the high-temperature steam admission chamber, the nozzles and the blades of the steam turbine high-pressure cylinder (1) meet requirements of the simultaneous realization of both the highest steam admission temperature and the highest mass flow rate and have sufficient safety allowance.

The steam turbine low-pressure cylinder (3) is constituted by three or four coaxial low-pressure cylinders of dual-flow and tangential steam admission depending on different operation backpressure; a steam admission temperature of the steam turbine low-pressure cylinder (3) is operated in the range of 343.5° C. to 253.6° C.; a maximum flow capacity of the steam turbine low-pressure cylinder (3) is designed based on a steam admission temperature of 343.5° C.; when a load of the gas turbine (20) is reduced, a steam admission temperature of the steam turbine low-pressure cylinder (3) is reduced to near 253.6° C., the main steam reheat shutoff valve (4) is switched on, and the steam-water separation reheater bypass valve (21) is switched off, so that the steam admission temperature of the steam turbine low-pressure cylinder (3) is not lower than 253.6° C.; when a load of the gas turbine (20) becomes 0, the first-stage steam extraction reheat shutoff valve (22) is switched on.

The gas turbine (20) is constituted by three H-class gas turbines; the three H-class gas turbines respectively drive respective turbogenerators; gas turbine steam exhaust from the outlets of the gas turbine groups of the three H-class gas turbines is discharged into a same waste heat boiler. In another preferred embodiment, the gas turbine (20) is constituted by six F-class gas turbines; in yet another preferred embodiment, the gas turbine (20) is constituted by four G-class gas turbines.

The steam-water separation reheater (2) is constituted by six or eight steam-water separation reheaters, that is, each steam admission and guide pipe of the low-pressure cylinder is equipped with a steam-water separation reheater.

Each steam-water separation reheater is equipped with a corresponding main steam reheat shutoff valve, a first-stage steam extraction reheat shutoff valve and a steam-water separation reheater bypass valve; when the steam-water separation reheater bypass valve is switched on, a pressure difference between an inlet and an outlet of the steam-water separation reheater does not exceed 15 kPa.

The gas turbine waste heat boiler comprises a waste heat boiler superheater (14), a waste heat boiler high-pressure economizer (15), and a waste heat boiler low-pressure economizer (16); horizontal arrangement; the waste heat boiler superheater (14) is constituted by three stages superheater heating surfaces of high-temperature stage, medium-temperature stage, and low-temperature stage, and is arranged in a counter-flow manner with respect to the smoke duct; the waste heat boiler high-pressure economizer system is equipped with corresponding regulating valve groups for regulating flow distributions at a water side of the waste heat boiler high-pressure economizer (15) and at a water side of the number one high-pressure heater (6); the low-pressure economizer system configuration of the waste heat boiler is equipped with corresponding regulating valve groups for regulating flow distributions at a water side of the waste heat boiler low-pressure economizer (16) and at a water side of a low-pressure heater group constituted by the number three low-pressure heater (9), the number four low-pressure heater (10), the number five low-pressure heater (11), and the number six low-pressure heater (12) connected in series.

What is claimed is:

1. A gas turbine and pressurized water reactor steam turbine combined circulation system, comprising:

a steam turbine high-pressure cylinder (1), a steam-water separation reheater (2), a steam turbine low-pressure cylinder (3), a main steam reheat shutoff valve (4), a condenser (5), a number one high-pressure heater (6), a second circuit main feed water pump (7), a deaerator (8), a number three low-pressure heater (9), a number four low-pressure heater (10), a number five low-pressure heater (11), a number six low-pressure heater (12), a condensate pump (13), a waste heat boiler superheater (14), a waste heat boiler high-pressure economizer (15), a waste heat boiler low-pressure economizer (16), a steam generator (17), a pressurized water reactor (18), a first circuit main feed water pump (19), a gas turbine (20), a steam-water separation reheater bypass valve (21), a first-stage steam extraction reheat shutoff valve (22), a distributed control system; heat generated by nuclear fuel rod in the pressurized water reactor (18) generates second circuit saturated steam in steam generator (17) through circulating first circuit pressurized water;

a saturated steam outlet of the steam generator (17) is connected to a steam inlet of the waste heat boiler superheater (14);

a steam outlet of the waste heat boiler superheater (14) is connected to a steam inlet of the steam turbine high-pressure cylinder (1) through a main steam valve and a speed control valve;

wherein the steam outlet of the waste heat boiler superheater (14) is connected to a main steam inlet of the steam-water separation reheater (2) through the main steam reheat shutoff valve (4); and wherein the first-stage steam extraction outlet of the steam turbine high-pressure cylinder is connected to a first-stage steam extraction inlet of the steam-water separation reheater (2) through the first-stage steam extraction reheat shutoff valve (22);

a water side of the waste heat boiler high-pressure economizer (15) is connected in parallel with a water side of the number one high-pressure heater (6), to heat a high-pressure feed water at an outlet of the second circuit main feed water pump (7) in a split manner;

a water side of the waste heat boiler low-pressure economizer (16) is connected in parallel with a water side of a low-pressure heater group constituted by the number three low-pressure heater (9), the number four low-pressure heater (10), the number five low-pressure heater (11) and the number six low-pressure heater (12) which are connected in series, to heat condensate at an outlet of the condensate pump (13) is heated in a shunt manner;

a turbocompressor inlet of the gas turbine (20) draws in air through an air filter group, and compressed air is mixed with natural gas and fully burned in the low nitrogen combustion system of the gas turbine (20), and high-temperature and high-pressure gas applies work in a gas turbine group of the gas turbine (20) to drive a turbogenerator at a side of the gas turbine; steam exhaust at the gas turbine group of gas turbine (20) enters a smoke-side inlet of a gas turbine waste heat boiler comprising the waste heat boiler superheater (14), the waste heat boiler high-pressure economizer (15), and the waste heat boiler low-pressure economizer (16) through a smoke duct;

a smoke-side outlet of the gas turbine waste heat boiler is connected to a chimney or smoke is exhausted by a cooling tower in a manner of integrated chimney and cooling tower;

a heavy-duty gas turbine and a pressurized water reactor steam turbine form a combined circulation system, and the heat of steam exhaust of the gas turbine is used to raise a main steam temperature of the second circuit from 272.8° C., where depending on different steam output of the pressurized water reactor as well as number and load of the heavy-duty gas turbine, the main steam temperature of the second circuit is operated in the range of 272.8° C. to 630° C.;

wherein the distributed control system coordinates the control of the pressurized water reactor (18), the gas turbine (20), the steam-water separation reheater (2), the main steam reheat shutoff valve (4), the first-stage steam extraction reheat shutoff valve (22), the steam-water separation reheater bypass valve (21), the steam turbine high-pressure cylinder (1), and steam turbine low-pressure cylinder (3), where depending on different steam output of the pressurized water reactor as well as number and load of the heavy-duty gas turbine, the main steam temperature of the second circuit is operated in the range of 272.8° C. to 630° C.;

wherein the steam turbine high-pressure cylinder (1) is of dual flow and tangential steam admission with a rotor speed of 1500 rpm or 1800 rpm, where its flow capacity is designed based on simultaneous realization of both highest steam admission temperature and highest mass flow rate; materials used for a rotor, a high-temperature steam admission chamber, nozzles and blades of the steam turbine high-pressure cylinder (1) meet requirements for continuous operation at the highest steam admission temperature; strengths of the rotor, the high-temperature steam admission chamber, the nozzles and the blades of the steam turbine high-pressure cylinder (1) meet requirements of the simultaneous realization of both the highest steam admission temperature and the highest mass flow rate and have sufficient safety allowance;

wherein the steam turbine low-pressure cylinder (3) is constituted by three or four coaxial low-pressure cylinders of dual-flow and tangential steam admission depending on different operation backpressure; a steam admission temperature of the steam turbine low-pressure cylinder (3) is operated in the range of 343.5° C. to 253.6° C.; a maximum flow capacity of the steam turbine low-pressure cylinder (3) is designed based on a steam admission temperature of 343.5° C.; when a load of the gas turbine (20) is reduced, a steam admission temperature of the steam turbine low-pressure cylinder (3) is reduced to near 253.6° C., the main steam reheat shutoff valve (4) is switched on, and the steam-water separation reheater bypass valve (21) is switched off, so that the steam admission temperature of the steam turbine low-pressure cylinder (3) is not lower than 253.6° C.; when a load of the gas turbine (20) becomes 0, the first-stage steam extraction reheat shutoff valve (22) is switched on; the gas turbine (20) is constituted by three H-class gas turbines; the three H-class gas turbines respectively drive respective turbogenerators;

a gas turbine steam exhaust from the outlets of the gas turbine groups of the three H-class gas turbines is discharged into a gas turbine waste heat boiler; the steam-water separation reheater (2) is constituted by six or eight steam-water separation reheaters, that is, each steam admission and guide pipe of the low-pressure cylinder is equipped with a steam-water separation reheater; each steam-water separation reheater is equipped with a corresponding main steam reheat shutoff valve, a first-stage steam extraction reheat shutoff valve and a steam-water separation reheater bypass valve; when the steam-water separation reheater bypass valve is switched on, a pressure difference between an inlet and an outlet of the steam-water separation reheater does not exceed 15 kPa;

wherein the gas turbine waste heat boiler comprises the waste heat boiler superheater (14), the waste heat boiler high-pressure economizer (15), and the waste heat boiler low-pressure economizer (16); horizontal arrangement; the waste heat boiler superheater (14) is constituted by three stages superheater heating surfaces of high-temperature stage, medium-temperature stage, and low-temperature stage, and is arranged in a counter-flow manner with respect to the smoke duct; the waste heat boiler high-pressure economizer system is equipped with corresponding regulating valve groups for regulating flow distributions at a water side of the waste heat boiler high-pressure economizer (15) and at a water side of the number one high-pressure heater (6); and wherein the low-pressure economizer system configuration of the waste heat boiler is equipped with corresponding regulating valve groups for regulating flow distributions at a water side of the waste heat boiler low-pressure economizer (16) and at a water side of a low-pressure heater group constituted by the number three low-pressure heater (9), the number four low-pressure heater (10), the number five low-pressure heater (11), and the number six low-pressure heater (12) connected in series.

\* \* \* \* \*